US008161080B2

(12) United States Patent
Gallant

(10) Patent No.: US 8,161,080 B2
(45) Date of Patent: Apr. 17, 2012

(54) XML BASED TRANSACTION DETAIL RECORDS

(75) Inventor: John Kenneth Gallant, Plano, TX (US)

(73) Assignee: Verizon Business Global LLC, Basking Ridge, NJ (US)

( * ) Notice: Subject to any disclaimer, the term of this patent is extended or adjusted under 35 U.S.C. 154(b) by 458 days.

(21) Appl. No.: 12/347,819

(22) Filed: Dec. 31, 2008

(65) Prior Publication Data

US 2009/0222457 A1 Sep. 3, 2009

Related U.S. Application Data

(62) Division of application No. 10/099,323, filed on Mar. 15, 2002, now Pat. No. 7,945,592.

(60) Provisional application No. 60/276,923, filed on Mar. 20, 2001, provisional application No. 60/276,953, filed on Mar. 20, 2001, provisional application No. 60/276,954, filed on Mar. 20, 2001, provisional application No. 60/276,955, filed on Mar. 20, 2001.

(51) Int. Cl.
*G06F 17/30* (2006.01)
*G06F 7/00* (2006.01)
(52) U.S. Cl. .................. 707/802; 455/405; 707/922
(58) Field of Classification Search .................. 707/802, 707/922, 999.101, 999.102, 999.107; 455/405, 455/406
See application file for complete search history.

(56) References Cited

U.S. PATENT DOCUMENTS 4,979,207 A * 12/1990 Baum et al. ............. 379/114.01
5,027,388 A 6/1991 Bradshaw et al.
5,565,316 A * 10/1996 Kershaw et al. ............. 434/322
5,579,379 A 11/1996 D'Amico et al.
5,812,668 A 9/1998 Weber
5,827,070 A * 10/1998 Kershaw et al. ............. 434/322
5,867,495 A 2/1999 Elliott et al.
6,016,343 A 1/2000 Hogan et al.
6,122,359 A 9/2000 Otto et al.
H1897 H 10/2000 Fletcher et al.
6,134,307 A 10/2000 Brouckman et al.
6,151,624 A 11/2000 Teare et al.
6,233,248 B1 5/2001 Sautter et al.
6,282,193 B1 8/2001 Hluchyj et al.
6,311,186 B1 10/2001 MeLampy et al.
6,377,672 B1 4/2002 Busuioc
6,377,939 B1 4/2002 Young
6,418,467 B1 7/2002 Schweitzer et al.

(Continued)

FOREIGN PATENT DOCUMENTS

EP 1 202 528 5/2002

(Continued)

OTHER PUBLICATIONS

Schulzrinne, H. and J. Rosenberg "Signaling for Internet Telephony", Columbia University, Department of Computer Science Technical Report CUCS-005-98, Jan. 31, 1998.*

(Continued)

*Primary Examiner* — Kimberly Lovel

(57) ABSTRACT

The present invention is directed to a method for managing transactions in a telecommunications network. The method includes creating an XML transaction detail file. At least one transaction detail record is stored in the XML transaction detail file in response to a telecommunications transaction. The at least one transaction detail record includes transaction data corresponding to the telecommunications transaction.

45 Claims, 2 Drawing Sheets

U.S. PATENT DOCUMENTS

| | | |
|---|---|---|
| 6,490,564 B1 | 12/2002 | Dodrill et al. |
| 6,499,054 B1 | 12/2002 | Hesselink et al. |
| 6,577,718 B1 | 6/2003 | Kalmanek et al. |
| 6,611,818 B1 | 8/2003 | Mersky et al. |
| 6,631,185 B1 | 10/2003 | Fleming |
| 6,631,186 B1 | 10/2003 | Adams et al. |
| 6,639,975 B1 | 10/2003 | O'Neal et al. |
| 6,707,915 B1 | 3/2004 | Jobst et al. |
| 6,714,992 B1 | 3/2004 | Kanojia et al. |
| 6,718,023 B1 * | 4/2004 | Zolotov ................. 379/133 |
| 6,751,652 B1 | 6/2004 | Thomas |
| 6,768,722 B1 | 7/2004 | Katseff et al. |
| 6,865,681 B2 | 3/2005 | Nuutinen |
| 6,870,845 B1 | 3/2005 | Bellovin et al. |
| 6,895,438 B1 | 5/2005 | Ulrich |
| 6,907,032 B2 | 6/2005 | Eastman |
| 6,952,800 B1 * | 10/2005 | Danner et al. ................. 715/234 |
| 6,980,526 B2 | 12/2005 | Jang et al. |
| 7,058,704 B1 * | 6/2006 | Mangipudi et al. ........... 709/223 |
| 7,076,040 B2 | 7/2006 | Carson et al. |
| 7,136,467 B2 | 11/2006 | Brockman et al. |
| 7,197,560 B2 | 3/2007 | Caslin et al. |
| 7,305,081 B1 | 12/2007 | Kalmanek et al. |
| 7,406,306 B2 | 7/2008 | Gallant et al. |
| 2001/0012346 A1 | 8/2001 | Terry |
| 2001/0050984 A1 | 12/2001 | Jordan |
| 2002/0010798 A1 | 1/2002 | Ben-Shaul et al. |
| 2002/0064149 A1 | 5/2002 | Elliott et al. |
| 2002/0090071 A1 | 7/2002 | Book et al. |
| 2002/0095339 A1 * | 7/2002 | Galloway ................. 705/14 |
| 2002/0103898 A1 | 8/2002 | Moyer et al. |
| 2002/0112187 A1 | 8/2002 | Dalton et al. |
| 2002/0123919 A1 | 9/2002 | Brockman et al. |
| 2002/0124100 A1 | 9/2002 | Adams |
| 2002/0126654 A1 | 9/2002 | Preston et al. |
| 2002/0127995 A1 | 9/2002 | Faccinn et al. |
| 2002/0129093 A1 | 9/2002 | Donovan et al. |
| 2002/0129236 A1 | 9/2002 | Nuutinen |
| 2002/0160810 A1 | 10/2002 | Glitho et al. |
| 2002/0188712 A1 | 12/2002 | Caslin et al. |
| 2003/0009557 A1 | 1/2003 | Carson et al. |
| 2003/0074313 A1 | 4/2003 | McConnell et al. |
| 2003/0079223 A1 * | 4/2003 | Galloway ................. 725/32 |
| 2003/0126257 A1 | 7/2003 | Vijay |
| 2004/0078349 A1 | 4/2004 | Syrjala et al. |
| 2007/0116232 A1 | 5/2007 | Sprokkereef |
| 2007/0206576 A1 | 9/2007 | Radulovic |
| 2008/0013531 A1 | 1/2008 | Elliott et al. |
| 2008/0025295 A1 | 1/2008 | Elliott et al. |

FOREIGN PATENT DOCUMENTS

| | | |
|---|---|---|
| WO | WO 00/52916 | 9/2000 |
| WO | WO 02075559 | 9/2002 |

OTHER PUBLICATIONS

Pan, P., H. Schulzrinne and P. Calhoun "Diameter: Policy and Accounting Extension for SIP", Internet Engineering Task Force, Nov. 15, 1998.*

Kausar, N., B. Briscoe and J. Crowcroft "A Charging Model for Sessions on the Internet", Proceedings of the Fourth IEEE Symposium on Computers and Communications (ISCC '99), 1999.*

Cisco System, "Overview of the Session Initiation Protocol", Copyright 1992, www.cisco.com/univered/c/td/doc/product/voice/sipsols/biggulp/bisipov.htm.

B. Sterman, Real-Time Billing in SIP, Deltahree, 2002, http://www.recursosvoip.com/docs/english/realtimebilling.pdf, 18 pages.

Lennox et al., "Implementing Intelligent Network Services with the Session Initiation Protocol", Columbia University Technical Report CUCS-002-99. Jan. 1999.

Polyzois et al., "From POTS to PANS—A Commentary on the Evolution to Internet Telephony", Mar. 26, 1999.

Handley et al., "RFC-2543—SIP: Session Initiation Protocol", www.ieft.org/rfc/rfc2543.txt, Mar. 1999.

Aboba et al., "The Accounting Data Interchange Format (ADIF)", ROAMOPS Working Group, Apr. 25, 2000.

Brownlee et al., "RFC-2924—Accounting Attributed and Record Formats", Sep. 2000.

Schulzrinne et al., "Signaling for Internet Telephony", Columbia University, Department of Computer Science Technical Report CUCS-005-98, Jan. 31, 1998.

Cisco Systems, "Release Note for Cisco MC3810—Software Requirement for Analog Personality Modules", Document No. 78-6053-01, 1998.

Usdin et al., "XML: Not a Silver Bullet, but a Great Pipe Wrench", StandardView, Sep. 1998, vol. 6, No. 3, pp. 125.

Schulzrinne, et al., "SIP Call Control Services," IETF Internet Draft, Jun. 17, 1999.

* cited by examiner

XML BASED TRANSACTION DETAIL RECORDS

CROSS-REFERENCE TO RELATED APPLICATIONS

This application is a divisional application of U.S. patent application Ser. No. 10/099,323, filed Mar. 15, 2002, which claims priority under 35 U.S.C. §119(e) based on U.S. Provisional Patent Application Ser. No. 60/276,923, filed Mar. 20, 2001, U.S. Provisional Patent Application Ser. No. 60/276,953, filed Mar. 20, 2001, U.S. Provisional Patent Application Ser. No. 60/276,954, filed Mar. 20, 2001, and U.S. Provisional Patent Application Ser. No. 60/276,955, filed Mar. 20, 2001, the contents of which are relied upon and incorporated herein by reference in their entirety.

BACKGROUND OF THE INVENTION

1. Field of the Invention

The present invention relates to telecommunications, and is more particularly related to recording transaction data in a telecommunications network.

2. Technical Background

There are many factors driving the move toward converged networks such as deregulation, new sources of competition, substantial growth of the Internet, and the growth and importance of data in customers' enterprise networks. The popularity and convenience of the Internet has resulted in the reinvention of traditional telephony services. IP (Internet Protocol) telephony, which is also referred to as Voice-over-IP (VoIP), involves the conversion of voice information into data packets that are subsequently transmitted over an IP network. IP telephony over the Internet is often offered at minimal, or no cost to the users. Thus, IP telephony has found significant success, particularly in the long distance market.

Users also have turned to IP telephony as a matter of convenience. Both voice and data services are often accessible through a single piece of equipment, e.g., the personal computer. Furthermore, traditional DTMF (Dual-Tone Multi-Frequency) phones can enjoy the benefits of VoIP technology through the use of network adapters. The continual integration of voice and data services further fuels this demand for IP telephony applications.

The primary incentives for customers to adopt a converged solution are cost and the promise of new and expanded capabilities. However, if IP telephony is to be fully accepted in the marketplace, VoIP must be interoperable with the Public Switched Telephone Network (PSTN) and have a comparable Quality of Service (QoS). Therefore, to ensure the highest success rate with the customers, the service providers need to build a network that provides call quality, service reliability, and security that is at minimum, on par with the PSTN. It is essential that IP Telephony solutions meet customer demands of high-quality, ease of use, superior customer service, and lower cost. Since the public Internet can only provide "best-efforts" service, managed IP networks are required to support VoIP traffic with the call quality, service reliability, and security that users are accustomed to.

One approach that is being considered in providing VoIP with the call quality, service reliability, and security that users are accustomed to, involves the Session Initiation Protocol SIP). SIP is an application-layer signaling protocol that has been developed to create, modify, and terminate sessions with one or more users. These sessions include Internet telephone calls, multi-media conferences, and multi-media distribution. SIP functionality is typically resident on application servers. Sip servers are configured to provide telephony services, and process call event information. Because vendors have developed their own custom SIP application programs, call events and telephony services are processed by each vendor's application server in a proprietary way. Unfortunately, when a network includes network elements provided by a multiplicity of vendors, it becomes necessary to accommodate a variety of proprietary interfaces that enable the devices to transmit and receive network transaction data. By way of example, transaction data may include call event information, billing information, monitoring information, error data, fraud prevention data, timeout data and any other data that must be tracked by the network.

What is needed is a platform independent method for capturing transaction data in a uniform manner. Preferably, the system and method will be extensible, providing embedded information that will enable a receiving computer to read the generic, uniformly formatted records without needing to accommodate any proprietary interface.

SUMMARY OF THE INVENTION

The present invention relates to a platform independent method for capturing transaction data and other information in a uniform manner. The method and system of the present invention is extensible, producing generic, uniformly formatted records that can be read by a receiving computer without needing a special proprietary interface.

One aspect of the present invention is a method for recording transactions in a telecommunications network. The method includes creating an XML transaction detail file. At least one transaction detail record is stored in the XML transaction detail file in response to a telecommunications transaction. The at least one transaction detail record includes transaction data corresponding to the telecommunications transaction.

In another aspect, the present invention includes a computer-readable medium having stored thereon a data structure for recording transactions in a telecommunications network. The data structure includes: an XML declaration field, the XML declaration field defining the data structure as an XML file; a server identification field, the server identification field including an IP address of a server generating the XML file; and a transaction detail section including at least one transaction detail record, the at least one transaction detail record being stored in the data structure in response to a telecommunications transaction, the at least one transaction detail record including transaction data corresponding to the telecommunications transaction.

In another aspect, the present invention includes a telecommunications network. The network includes at least one telecommunications apparatus configured to perform a telecommunications transaction. At least one SIP-server is coupled to the at least one telecommunications apparatus. The at least one SIP-server is configured to create an XML transaction detail file, process the telecommunications transaction, and store at least one transaction detail record in the XML transaction detail file. The at least one transaction detail record includes transaction data corresponding to the telecommunications transaction.

In another aspect, the present invention includes a computer-readable medium having stored thereon computer-executable instructions for performing a method for recording transactions in a telecommunications network. The method includes creating an XML transaction detail file. The XML transaction detail file is active for a predetermined period of time. At least one transaction detail record is stored in the XML transaction detail file in response to a telecommunications transaction. The at least one transaction detail record includes transaction data corresponding to the telecommunications transaction.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Figure 1:
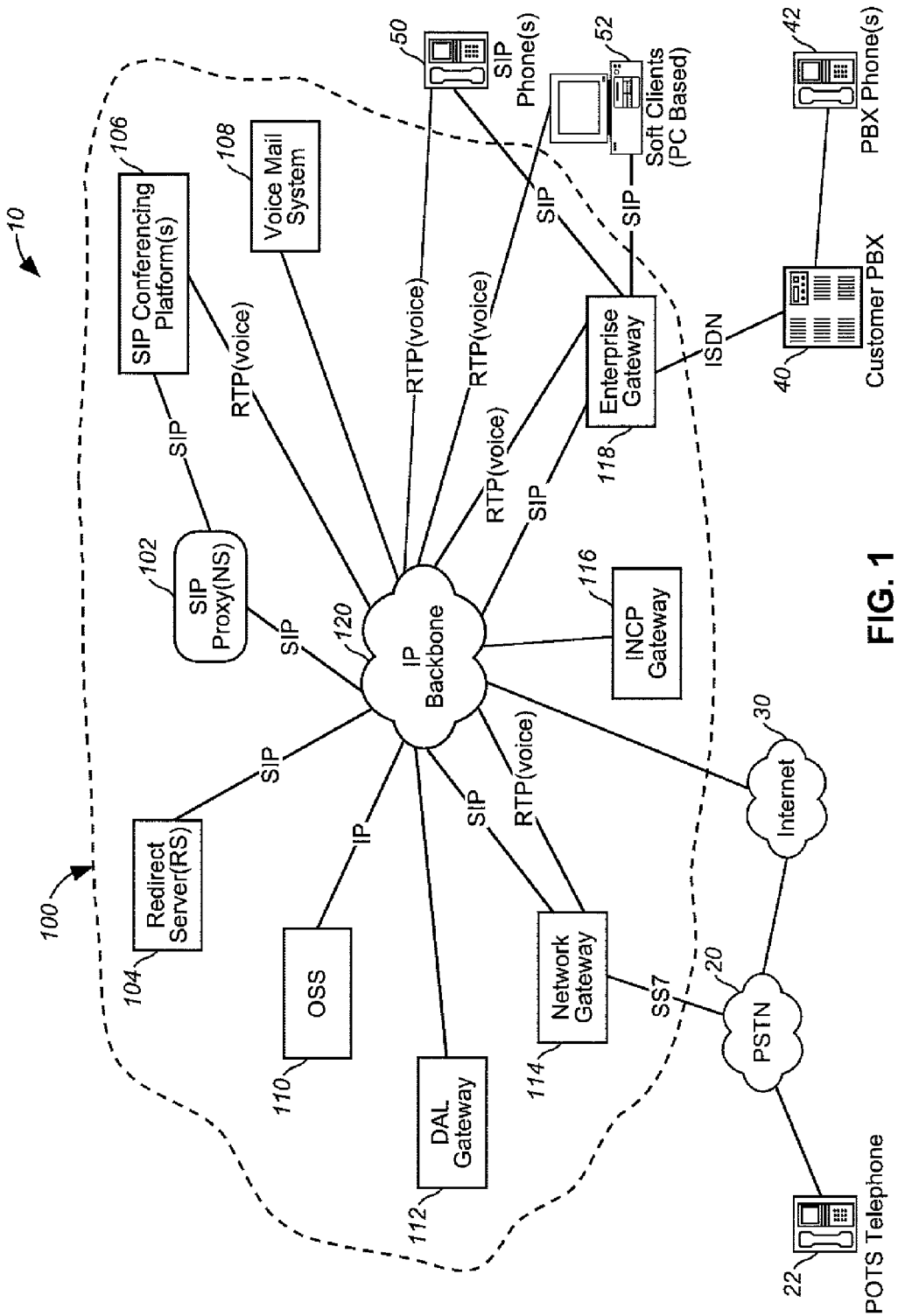
FIG. 1 is a block diagram of an IP telecommunications network in accordance with one embodiment of the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the network of the present invention is shown in FIG. 1, and is designated generally throughout by reference numeral 10.

In accordance with the invention, the present invention includes a method for recording transactions in a telecommunications network. The method includes creating an XML transaction detail file. At least one transaction detail record is stored in the XML transaction detail file in response to a telecommunications transaction. The at least one transaction detail record includes transaction data corresponding to the telecommunications transaction. The present invention provides a platform independent method for capturing transaction data and other information in a uniform manner. The system and method of the present invention is extensible, providing embedded information in generic, uniformly formatted transaction detail records that can be read by a receiving computer without needing a special proprietary interface.

As embodied herein, and depicted in FIG. 1, a block diagram of an IP telecommunications network 10 in accordance with one embodiment of the present invention is disclosed. Telecommunications network 10 includes IP network 100 coupled to the Public Switched Telephone Network (PST) 20, Internet 30, a customer PBX 40, SIP phones 50, and SIP-clients 52. IP network 100 includes IP network backbone 120. Backbone 120 is coupled to a number of SIP elements that support voice services, including SIP proxy server 102, redirect server (S) 104, SIP conferencing server 106, voice mail server 108, Operational Support Systems (OSS) 110, Dedicated Access Line (DAL) gateway 112, network gateway 114, INCP gateway 116, and enterprise gateway 118. Network backbone 120 is also directly coupled to Internet 30, SIP phones 50, and SIP Clients 52. Although the present invention is discussed with respect to the Session Initiation Protocol (SIP) and an Internet Protocol (IP)-based network, those of ordinary skill in the art will recognize that the present invention is equally applicable to other telecommunication networks and protocols.

IP network 100 may be of any suitable type, but there is shown by way of example a network having a layered architecture. The layered nature of the architecture provides protocol separation and independence, whereby one protocol can be exchanged or modified without affecting the other higher layer or lower layer protocols. It is advantageous that the development of these protocols can occur concurrently and independently. The foundation of the layered architecture is the Internet Protocol (IP) layer. The IP layer provides a connectionless data delivery service that operates on a "best effort" basis; that is, no guarantees of packet delivery are made. A TCP (Transmission Control Protocol) layer is disposed above the IP layer. The TCP layer provides a connection-oriented protocol that ensures reliable delivery of the IP packets, in part, by performing sequencing functions. This sequencing function reorders any IP packets that arrive out of sequence. In another embodiment, the UDP (User Datagram Protocol) is employed instead of TCP. The User Datagram Protocol provides a connectionless service that utilizes the IP protocol to send a data unit, known as a datagram. Unlike TCP, UDP does not provide sequencing of packets. It relies on the higher layer protocols to sort the arriving packets. UDP is preferable over TCP when the data units are small, which saves processing time because of the minimal reassembly time. One of ordinary skill in the art will recognize that embodiments of the present invention can be practiced using either TCP or UDP, as well as other equivalent protocols.

A telephony application layer is disposed over the TCP layer. In one embodiment, the Session Initiation Protocol (SIP) is employed. SIP is an application-layer control (signaling) protocol for creating, modifying, and terminating sessions with one or more participants. SIP is also a client-server protocol wherein servers respond to requests generated by clients. A detailed discussion of SIP and its call control services are described in IETF RFC 2543 and IETF Internet Draft "SIP Call Control Services", Jun. 17, 1999. Both of these documents are incorporated herein by reference as though fully set forth in their entirety. Those of ordinary skill in the art will recognize that application-layer protocols other than SIP may be employed, including the H.323 protocol.

Finally, the Session Description Protocol (SDP) is disposed above SIP in the layered architecture. SDP provides information about media streams in the multimedia sessions, permitting the recipients of the session description to participate in the session.

IP network backbone 120 may be of any suitable type, but there is shown by way of example a network that includes a nationwide high speed network that operates at 622 MB/sec (OC-12). Backbone 104 employs advanced packet switching technology commonly known as the Asynchronous Transfer Mode (ATM). Backbone 120 also utilizes a fiber-optic transmission technology referred to as the Synchronous Optical Network (SONET). The combination of ATM and SONET enables high speed, high capacity voice, data, and video signals to be combined and transmitted on demand. The high speed of backbone 120 is achieved by connecting Internet Protocol through the ATM switching matrix, and running this combination on the SONET network.

INCP 116 is an Intelligent Network Control Point that is accessed by RS 104 to obtain dial plan information for existing private network customers. INCP 116 is an additional database that may be queried by RS 104 to route specific private calls. INCP 116 may also be accessed by SPS 102.

PSTN 160 is, by way of example, a circuit switched network employing Signaling System No. 7 (SS7). Plain-Old-Telephone-Service (POTS) telephone 22 may be any suitable telephone set currently in use or on the market.

Enterprise gateway 118 may be of any suitable type. In the example depicted in FIG. 1, enterprise gateway 118 is coupled to PBX 40. Those of ordinary skill in the art will recognize that enterprise gateway 118 may also couple IP network 100 to other enterprise networks, such as LANs and/or WANs. Referring back to FIG. 1, PBX 40 includes trunks or lines for PBX phones 42. Enterprise gateway 118 provides the interface between packet switched IP network 100 and the signaling employed by PBX 40. For example, enterprise gateway 118 may use Integrated Digital Services Network (ISDN), Circuit Associated Signaling (CAS), or other PBX interfaces (e.g., European Telecommunications Standards Institute (ETSI) PRI, R2) to interface with PBX 40.

DAL gateway 112 is a system configured to support private traffic between IP locations and non-IP locations. DAL gateway 112 may be optionally employed in network 100.

Network gateway 114 is an SS7 (Signaling System 7)/C7-to-SIP Gateway. This provides users with the ability to place calls between locations within IP network 100 and locations within PSTN 20. For example, network gateway 114 is configured to provide access to a voice switch (not shown), such as a Class 3 switch for domestic call processing, or a Class 5 switch for long-haul and/or international connections.

SIP phones 50, and SIP-client devices 52, may be of any suitable type provided that they conform to the standards promulgated in IETF 2543. SIP phones 50 have a 10-key dial pad similar to traditional phones. SIP URLs, which include PSTN 20 numbers, can be entered using the keypad or retrieved from a speed dial directory. To place a call, digits are entered using the dial pad. The entered digits are collected by the phone. When the "Dial" button is pressed, the call is initiated. SIP phones 50 ring similar to traditional phones when receiving an incoming call. SIP phones 50 may take the form of standalone devices—e.g., a SIP phone may be configured to function and appear like a Plain Old Telephone Service (POTS) telephone set. On the other hand, SIP client 52 is a software client that runs, for example, on a personal computer (PC) or laptop. From a signaling perspective, SIP-devices 50 and 52 are very similar, if not identical, in some cases.

At this point, the various SIP-servers disposed in network 100 will be described in more detail. Each type of server in network 100 has a critical role in recording and managing the various transactions supported by network 100.

Referring back to FIG. 1, SIP-proxy server (SPS) conforms with SIP standards detailed per IETF RFC 2543. SPS 102 functions as both a server and a client for the purpose of making requests on behalf of other clients. SPS 102 may service a request directly or pass it on to another server. SPS 102 may also rewrite a message before forwarding it. SPS 102 is configured to create a transaction detail file in XML format to record transaction data processed by SPS 102. The transaction detail file is populated with transaction detail records (TDR). Each TDR records a transaction such as a SIP call-event (INVITE, ACK, BYE, CANCEL, OPTIONS, REGISTER, etc.), or any of the other events described above, such as errors, or timeouts. SPS 102 includes an XML processor module that is called by SPS 102 application software to create the XML transaction detail file. The XML processor module may also be called upon to read XML documents, e.g., to provide access to the content and structure of an XML file. The format of the XML transaction detail file is shown in detail in Table I.

TABLE 1

| SIP Service Transaction Detail File Structure-Network Server | | |
|---|---|---|
| Fields | Syntax/Description | Comments |
| XML Declaration | <?xml version="1.0"?><br>Used to define the file as an XML document. This XML declaration is located on the first line of the file and is used to identify the file as an XML file. | Only one per file |
| XML Document Type | <tdr><br>Used to define the beginning of the TDR document. | Only one per file.<br>Always after the XML declaration. |
| Network Server ID | <nsid>AA.BB.CC.DD:port<nsid><br>(e.g. 166.23.44.157)<br>The Network Server IP address, where AA, BB, CC, DD can be digits 0 through 255 and port can be a number 1024 through 65535. | One per TDR file |
| Time | <time>Wed Mar 1 10:55:21 2000</time><br>A time field contains the time that this TDR field was opened in the following form:<br><time> Abbreviated Day <space+> Abbreviated month <space+> Day of month <space+> Hour <:> Minute <:> Second <space+> Year <time><br>Where:<br>Abbreviated Day = Mon/Tue/Wed/Thu/Fri/Sat/Sun<br>Abbreviated Month = Jan/Feb/Mar/Apr/May/Jun/Jul/Aug/Sep/Oct/Nov/Dec<br>Day of month = 1 thru 31<br>Hour = 00 thru 23<br>Minute = 00 thru 59<br>Second = 00 thru 59<br>Year = 4 digit year | One time per TDR file |

TABLE 1-continued

SIP Service Transaction Detail File Structure-Network Server

| Fields | Syntax/Description | Comments |
| --- | --- | --- |
| Tdr Record | <tdr_record><br>Contains that fields that are to be recorded for an event (message or other event). | Multiple Tdr Records may be in one TDR file (or none if time period expires with no events processed) |
| Correlation ID | <corr_id>text</corr_id><br>The correlation ID is used to uniquely identify all events (messages, features, etc.) that occur for a NS transaction (in the case of REGISTERs) or Session (in the case of INVITEs), starting with the reception of a SIP Request at the NS, and ending when the transaction (in the case of REGISTERs) or Session (in the case of INVITEs). This includes all messaging and feature processing that is done at the RS and the DAP for an NS transaction.<br>The field will contain the value of the CallID that was present in the original request received at the NS. | One Correlation ID per Tdr Record |
| Time | <time>Wed Mar 1 10:55:21 2000</time><br>A time field contains the time that the event (message or other event occurred). The format is specified above. | One time per TDR record |
| Request | <request><br>A request contains the information about any SIP Request that is either sent or received by the NS. NOTE: Requests sent to the RS and AUS are not recorded. | Optional field - if present on per Tdr Record |
| Received-from | <received-from>AA.BB.CC.DD : port/received-from><br>(e.g. 166.23.44.157 : 5060)<br>The IP Address that the Request message was received from if the Request was received at the NS, where AA, BB, CC, DD can be digits 0 through 255 and port can be a number 1024 through 65535. | One Received-from element per Request |
| Sent-to | <sent-to>AA.BB.CC.DD : port</sent-to><br>(e.g. 166.23.44.157 : 5060)<br>The IP Address that the Request message was sent to if the Request was sent by the NS, where AA, BB, CC, DD can be digits 0 through 255 and port can be a number 1024 through 65535. | One Sent-to element per Request |
| Message | <msg>text</msg><br>This is a text field that will have all the fields associated with the particular request including, but not limited to: Request line, To, From, Call ID, Cseq, Via, Record-Route, Route, Expires. Max-Forwards, Proxy-Authorization, Proxy-Require, Correlation ID, and Contact.<br>The NS will not record headers in the message that it does not use in processing, nor record the message body, for performance reasons. | One Message per Request |
| Request-End Delimiter | </request><br>Used to define the end of the request fields withing a TDR Record. | Optional field - if present, one per Tdr Record |
| Authentication | <auth><br>This field records information on the authentication that was performed on a request. If no authentication was performed. | Optional field - if present, one per Tdr Record |
| Authentication Indicator | <auth_ind>text</auth_ind><br>This field records the reason that authentication was performed. The values for this field are as follows:<br>"Proxy-Authorization Header Present"<br>"Authorization Header Present"<br>"Authentication for Method is active in Auth Entity Table"<br>"Authentication for Method is active in Global Table"<br>"Next Hop (Route Header) is a protected entity"<br>"AuthEntity has disabled record for source address" | One per Authentication |
| Authentication Server Indicator | <aus_query>text</aus_query><br>This field is recorded when a query was sent to the Aus. If no query was sent, this field would not be present.<br>The values for this field are as follows:<br>"Pending Challenge where nonce matches"<br>"Auth Cache exists, but response does not match"<br>"Auth Cache exists, but expiration time needs update" | Optional field - if present, one per Authentication |
| Authentication Result | <auth_res>text</auth_res><br>This is a text field that indicates the results of authentication if it was performed. If authentication was not performed, this field will not be present.<br>The possible values are as follows:<br>"Pass-Trusted Entity"<br>"Pass-Authenticated"<br>"Pass-Non Trusted User" | One per Authentication |

TABLE 1-continued

SIP Service Transaction Detail File Structure-Network Server

| Fields | Syntax/Description | Comments |
|---|---|---|
| | "Fail-Entity Disabled"<br>"Fail-System Failure"<br>"Challenge-User information not found"<br>"Challenge-Authentication information mismatch"<br>"Challenge-No local Pending Challenge or Auth Cache Record"<br>"Challenge-Expired Pending Challenge"<br>"Challenge-Expired Auth Cache" | |
| Authentication - End Delimiter | </auth><br>Used to define the end of the Authentication fields withing a Tdr Record. | Optional field - if present, one per Tdr Record |
| Response | <response><br>A response contains the information about any SIP Response that is either sent or received by the NS. NOTE: Responses received from the RS or AUS are not recorded. | Optional field - if present one per Tdr record |
| Received-from | <received-from>AA.BB.CC.DD : port</received-from><br>(e.g. 166.23.44.157 : 5060)<br>The IP Address that the Response message was received from if the Response was received at the NS, where AA, BB, CC, DD can be digits 0 through 255 and port can be a number 1024 through 65535. | One Received-from element per Response |
| Sent-to | <sent-to>AA.BB.CC.DD : port</sent-to><br>(e.g. 166.23.44.157 : 5060)<br>The IP Address that the Response message was sent to if the Response was sent by the NS, where AA, BB, CC, DD can be digits 0 through 255 and port can be a number 1024 through 65535. | One Sent-to element per Response |
| Message | <msg>text</msg><br>This is a text field that will have all the fields associated with the particular Response including, but not limited to: Status Line, To, From, Call ID, Cseq, Via, Record-Route, Proxy-Authenticate, and Contact.<br>The NS will not record headers in the message that it does not use in processing, nor record the message body, for performance reasons. | One Message per Response |
| Response - End Delimiter | </response><br>Used to define the end of the response fields withing a Tdr Record. | Optional field - if present, one per Tdr Record |
| Event | <event>text</event><br>Used to record events other than messages that caused actions at the NS during a transaction.<br>The possible values are as follows:<br>"TCP Connection to OUA lost"<br>"TCP Connection to TUA" AA.BB.CC.DD:EE "lost" - where AA.BB.CC.DD is the IP address and EE is the port number of the TUA<br>"TCP Connection to TUA" AA.BB.CC.DD:EE "could not be established" - where AA.BB.CC.DD is the IP address and EE is the port number of the TUA<br>"RS Timeout" for AA.BB.CC.DD:EE - where AA.BB.CC.DD is the IP Address and EE is the port number of the RS that timed out<br>"UA Invite Timeout for TUA" AA.BB.CC.DD:EE - where AA.BB.CC.DD is the IP Address and EE is the port number of the TUA<br>"UA Non-Invite Timeout for TUA" AA.BB.CC.DD:EE - where AA.BB.CC.DD is the IP Address and EE is the port number of the TUA<br>"ACK Timeout"<br>"Txn Clear Timeout"<br>"Expires Timeout"<br>"AuS Timeout" for AA.BB.CC.DD"EE - where AA.BB.CC.DD is the IP Address and EE is the port number of the AUS that timed out<br>"Ring Timeout for TUA" AA.BB.CC.DD:EE - where AA.BB.CC.DD is the IP Address and EE is the port number of the TUA<br>"487 Timeout for TUA" AA.BB.CC.DD:EE - where AA.BB.CC.DD is the IP Address and EE is the port number of the TUA | |
| TDR Data - End Delimiter | </tdr_record><br>Used to define the end of the TDR Record fields within a TDR File | Multiple Tdr Records may be in one TDR file (or none if timer period expires with no |

TABLE 1-continued

SIP Service Transaction Detail File Structure-Network Server

| Fields | Syntax/Description | Comments |
|---|---|---|
| XML Document Type end | </tdr><br>Used to define the end of the TDR Document. | events processed) Only one per file. Always at the end of the file. |

Voice mail server (VMS) 108 is a SIP-server that provides voice mail services. Users of the IP network 100 are provided with the capability to integrate voicemail services based upon SIP. Calls are routed to the voice mail system 108 by SPS 102 and RS 104 for certain calls, such as those that indicate a Busy or Ring No Answer condition. Calls to voice mail can also occur as a Find-Me/Follow-Me termination option, or as an Unconditional Call Forward option selected by the user. Calls by the user to log in and retrieve messages are routed to VMS 108 as a SIP endpoint. A voice mail address can be entered for any destination address in RS 104. For instance, the Call Forwarding Unconditional address or Find-Me address, etc., can be the SIP URL of a voice mail account, SIP enabled VMS 108 supports all alphanumeric SIP URLs, Headers, Request, Methods and Status codes (e.g., per IETF RFC 2543). VMS 108 supports SUBSCRIBE, NOTIFY, and Message Waiting Indicator (MWI) messages.

VMS 108 may restrict access to the system through a variety of ways. Access may be secured through private access code. The access code may be supplied in the SIP INVITE message or through DTMF. VMS 108 may reject messages based on the IP address of the originating server. In other words, if the message is coming from a server that is not trusted, then VMS 108 may reject the message.

VMS 108 is also configured to create a transaction detail file in XML format to thereby record transaction data corresponding to all network transactions processed by VMS 108. Because the format of the VMS XML transaction detail file is very similar to the SPS 102 XML transaction detail file, it will not be repeated here.

SIP conferencing server (SCS) 106 is a centralized SIP-conference server configured to provide audio conferencing capabilities. SCS 106 support G.711 (RTP/AVT 0), as well as other codecs. SCS 106 may specify two modes of operation. Under a Reserved mode, the users are required to reserve a bridge ahead of time. An Instant Conferencing mode refers to the ability to set-up a conference as needed without any need for advance reservation, allowing ad-hoc set-up of conferences as well permitting client based conferences to migrate to a bridge. Conference access is secured through an access code. Participants joining the bridge can send their access code via the SIP Invite message. POTS telephone users can enter through DTMF depending on the support for DTMF at the gateway. An audible tone may be played to announce each participant as they join the bridge. The system supports a coordinator/operator initiated conference, wherein the operator dials-out to each of the conference participants and brings them into the conference. The conference operator can enter and announce the name of the participants into the conference. The conference coordinator can notify the participants of the time and date for the call. The operators may be able to put parties On and Off Hold. Music On Hold is supported, whereby the parties on Hold are provided with music.

SCS 106 also permits private conferencing (i.e., sub-conferencing), wherein designated conference callers may confer privately within a conference call and then be returned to the main call. Calls from PSTN 20 may be forwarded to SCS 106 by network gateway 114. From the perspective of SCS 106, a SIP originated call is not processed differently than a non-SIP call because network gateway 114 is able to translate the called number to the conference URL. However, SCS 106 is able to validate the caller by prompting for passwords and validating the password entered as DTMF digits. As an alternate to password collection through DTMF, SCS 106 may support authentication using SIP. In this scenario, the SIP INVITE message carries additional user parameters, such as username/password combination that may be used by SCS 106 to validate the user. Further, conferencing system 106 supports web based provisioning by the users. SCS 106 interfaces with the OSS 110 for provisioning, alarming and reporting. The provisioning and reporting interface of the OSS 110 assists with a number of conferencing functionalities, such as the capability to Setup, Modify and Delete conferences. The administrator or moderator of the conference is able to specify the number of attendees to a conference, as well as specify duration of the conference, date and time-by-time zone, and name of reserved conference.

SCS 106 is configured to create a transaction detail file in XML format to thereby record transaction data corresponding to all the above described transactions processed by conferencing server 106. Because the format of the SCS 106 XML transaction detail file is similar to the SPS 102 XML transaction detail file, it will not be repeated.

RS 104 is a SIP redirect server that conforms with SIP standards detailed per IETF RFC 2543. RS 104 accepts SIP messages, maps the address into one or more new addresses, and returns these addresses to the client, which could be SPS 102. RS 104 does not initiate its own SIP requests, and RS 104 does not accept calls. RS 104 is essentially, a location server wherein information about possible terminating locations can be obtained. RS 104 also serves as a repository for end user information enabling address validation, feature status, and real-time subscriber feature configuration. RS 104 may also be used to store configuration information.

RS 104 is also configured to create a transaction detail file in XML format to thereby record transaction data corresponding to all SIP transactions, timeouts and errors processed by RS 104. The transaction detail file includes transaction detail records used to record network transactions processed by RS 104. RS 104 includes an XML processor module that is called by RS 104 application software module to create the XML transaction detail file. The XML processor module may also be called to read an XML file. Because RS 104 has a different function in the management of network 100, its XML transaction detail file is substantially different than the SPS XML transaction detail file. The format of the RS XML transaction detail file is shown in detail in Table II.

TABLE II

| Fields | Syntax/Description | Comments |
| --- | --- | --- |
| XML Declaration | <?xml version="1.0"?><br>Used to define the file as an XML document. This XML declaration is located on the first line of the file and is sued to identify the file as an XML file. | Only one per file |
| XML Document Type | <tdr><br>Used to define the beginning of the TDR document | Only one per file. Always after the XML declaration. |
| Redirect Server ID | <rsid>AA.BB.CC.DD:port</rsid><br>(e.g. 166.23.44.157:5060)<br>The Redirect Server IP address where AA, BB, CC, DD can be digits 0 through 255 and port can be a number 1024 through 65535. | Only one per file |
| Time | <time>Wed Mar 1 10:55:21 2000</time><br>The time field contains the time that this TDR file was opened in the following form:<br><time>AbbreviatedDay<space+>Abbreviated Month <space+>Day of Month<space+>Hour<:>Minute <:>Second<space+>Year</time><br>Where:<br>Abbreviated Day = Mon/Tues/Wed/Thu/Fri/Sat/Sun<br>Abbreviated<br>Month + Jan/Feb/Mar/Apr/May/Jun/Jul/Aug/Sep/Oct/Nov/Dec<br>Day of Month = 1 thru 31<br>Hour = 00 thru 23<br>Minute = 00 thru 59<br>Second = 00 thru 59<br>Year = 4 digit year | One time per TDR file |
| Tdr Record | <tdr_record><br>Contains the fields that are to be recorded for a transaction within the RS. | Multiple Tdr Records may be in one TDR file (or none if time period expires with no transaction processed) |
| Correlation ID | <corr_id>text</corr_id><br>The correlation ID is used to uniquely identify all events (messages, features, etc.) that occur for a NS transaction (in the case of REGISTERS) or Session (in the case of INVITE), starting with the reception of a SIP Request at the NS, and ending when the transaction(in the case of REGSTER) or session (in the case of INVITE). This includes all messaging and feature processing that is done at the RS and the DAP for an NS transaction.<br>The filed will contain the value of the Call ID that was present in the original request received at the NS. | One Correlation ID per Tdr Record |
| Request | <request><br>A request contains the information about the initial SIP Request message that is received at the RS from the NS. This request is what triggers the transaction processing at the RS. | One Request per Tdr Record |
| Received-from | <received-from>AA.BB.CC.DD:port</received-from><br>(e.g. 166.23.44.157 : 5060)<br>The IP address and port that the request was received from - where AA, BB, CC, DD can be digits 0 through 255 and port can be a number 1024 through 65535. | One Received-from element per Request |
| Time | <time>Wed Mar 1 10:55:21 2000</time><br>The time field contains the time that the request was received. Same format as described above | One time per Request |
| Message | <msg>text</msg><br>The contents of the SIP message that was received from the NS. This will have all the fields associated with the particular request including, but not limited to: Request URI, To, From, Call ID, Cseq, Via, Proxy-Authorization, Expires and Contact. | One Message per Request |
| Request-End Delimiter | </request><br>Used to define the end to the request fields within a TDR Record | One Request per Tdr Record |
| Feature | <feature><br>This field is used to record the data concerning the features that were executed at the RS during the transaction. If no features were executed, this field will not be included in the Tdr Record. | Optional field-if present, one per Tdr Record |
| Recursive Call Routing | <rec_call_routing><br>This field is sued to record when the recursive call routing feature is invoked. It is invoked when a non-final address that was passed back to the NS results | Optional field-if present, one per feature. |

TABLE II-continued

SIP Services Transaction Detail File Structure - Redirect Server

| Fields | Syntax/Description | Comments |
|---|---|---|
| | in a new query to the RS with previous context information appended to the Request UR1 of the new query. This will only be present when the "final-no" or "final = egwy" URL parameter is received on the RequestURI. | |
| Terminating Nature of Address | <term_noa>text</term_noa><br>This field is used to record the terminating Nature of Address which appears as a url parameter in the RequestURI<br>The possible values for this are the following:<br>"Private"<br>"Local"<br>"E.164"<br>"IP Address" | One per Recursive Call Routing |
| Originating Dial Plan ID | <orig_dpid>text</orig_dpid><br>This field is used to record the originating dial plan Id which appears as a url parameter in the RequestURI | One per Recursive Call Routing |
| Location Name | <locname>text<locname><br>This field is used to record the location name which appears as a url parameter in the RequestURI | One per Recursive Call Routing |
| Recursive Call Routing - End Delimiter | </rec_call_routing><br>Used to define the end of the Recursive Call Routing fields within a TDR Record | Optional field-if present, one per Feature |
| Originating Call Validation | <orig_val><br>This field is used to record the data gathered during the validation of the originator of the call. This data includes the nature of address, the dial plan ID, the prefix plan ID, the location name, and an indicator if the subscriber was not authorized.<br>If there is no record for the originator of the call, portions of this data (dial plan ID, prefix plan ID, location name) will be retrieved for the gateway ($2^{nd}$ most Via header in the request).<br>If there is no record for the gateway, portions of this data (dial plan ID, prefix plan ID, location name) will be retrieved from the global information table. | Optional field - if present, one per Feature |
| Originating Nature of Address | <orig_noa>text</orig_noa><br>This field is used to record the nature of address for the originating subscriber based on the user portion of the From Header in the Request message.<br>The possible values for this are the following:<br>"Private"<br>"E.164"<br>"IP Address" | One per Originating Call Validation |
| Originating Dial Plan ID | <orig_dpid>text</orig_dpid><br>This field is used to record the dial plan ID of the originating subscriber. This is retrieved from the subscriberID or authprof record(depending on the present of Proxy-Authorization Header) if present. If not present, it is retrieved from the rsgwyinfo record if present. If not present, it is retrieved, from the rsglobal record. | One per Originating Call Validation |
| Prefix Plan ID | <ppid>text</ppid><br>This field is used to record the prefix plan ID for the originating subscriber. This is retrieved from the subscriber record if present. If not present, it is retrieved from the rsgwyinfo record if present. If not present, it is retrieved from the served terminating hosts recotd. | One per Originating Call Validation |
| Location Name | <locname>text</locname><br>This field is used to record the location name for the originating subscriber. This is retrieved from the subscriber record if present. If not present, it is retrieved from the rsgwyinfo record if present. If not present, it is retrieved from the rsglobal record. | One per Originating Call Validation |
| Not Authorized Indicator | <not_auth>text</not_auth><br>This field is present if the originating subscriber if found to be unauthorized to make any phone calls. Its value if present is "Not Authorized." | Optional field-if present, one per Originating Call Validation |
| Not Trusted Indicator | <not_trusted>text</not_trusted><br>This field is present if the originating subscriber is not trusted. An originating subscriber is considered not trusted when it is a non-authenticated user that does not come through a trusted entity. The fields value if present is "Not Trusted." | Optional field-if present, one per Originating Call Validation |

TABLE II-continued

SIP Services Transaction Detail File Structure - Redirect Server

| Fields | Syntax/Description | Comments |
| --- | --- | --- |
| Originating Call Validation-End Delimiter | </orig_val><br>Used to define the end of the originating call validation fields within a TDR Record | Optional field-if present, one per Feature |
| Not Trusted Terminating Call | <non_trusted_term>text</non_trusted_term><br>This field is present if a call is originated from a non-trusted user. It is used to record whether or not a non-trusted call was allowed, and if so, whether the terminating subscriber's profile allowed the call, or whether the served hosts dial plan allowed the call. The possible values for this field are the following:<br>"Non-Trusted User - Call Not Allowed"<br>"Non-Trusted User - Call Allowed by Profile"<br>"Non-Trusted User - Call Allowed by dial plan" | Optional field - if present, one per Feature |
| Terminating Call Validation | <term_val><br>This field is used to record the data gathered during the validation of the subscriber that is being called. This data includes the nature of address, the dial plan ID, and an indicator if the subscriber was not authorized.<br>If there is no record for the subscriber that is being called, there will be no value for the dial plan ID or the not authorized indicator. | One per Feature |
| Terminating Nature of Address | <term_noa>text</term_noa><br>This field is sued to record the nature of address for the terminating subscriber based on the user portion of the Request URI.<br>The possible values at this point in processing are:<br>"IP Address"<br>"E.164"<br>"Other." If the values is "Other," it implies that the Flexible Dialing Plan Feature will need to be involked to determine the noa for further feature processing. | One per Terminating Call Validation |
| Terminating Dial Plan ID | <term_dpid>text</term_dpid><br>This field is used to record the dial plan ID of the terminating subscriber. This is retrieved from the subscriberID record if present. If not present this field will have the same value as the originating dpid. | One per Terminating Call Validation |
| Not Authorized Indicator | <not_auth>text</not_auth><br>This field is present if the terminating subscriber if found to be unauthorized to receive phone calls. Its value if present is "not Authorized." | Optional Field-if present, one per Terminating Call |
| Profile Found Indicator | <profile_found>text</profile_found><br>This field is used to record whether or not a profile record was found for the terminating subscriber. The possible values for this field are the following:<br>"Profile found"<br>"Profile not found" | One per Terminating Call Validation |
| Terminating Call Validation-End Delimiter | </term_val><br>Used to define the end of the terminating call validation fields within a TDR Record | Optional field -if present, one per Feature |
| Originating Call Screening | <ocs><br>This field is sued to record information when the originating call screening (aka Call Blocking) feature is executed at the RS. If the feature if not executed, this field will not be present. | Optional field-if present, one per Feature |
| Originating Call Screening List Number | <list>text</list><br>This field records the list number that was used to determine whether the call should be blocked or allowed. It was retrieved from the subscriber record if present. If no subscriber record was present, it was retrieved from the rsgwyinfo table. If no rsgwyinfo record was present, it was retrieved from the rsglobal table. | One per Originating Call Screening |
| Originating Call Screening Result | <result>text</result><br>This field records the result of the Originating Call Screening Feature. The possible values are "Blocked" and "Allowed." | One per Originating Call Screening |
| Originating Call Screening-End Delimiter | </ocs><br>Used to define the end of the Originating Cell Screening fields Within a TDR Record | Optional field-if present, one per Feature |
| Terminating Call Screening | <tcs><br>This field is used to record information when the terminating call screening feature is executed at the RS. IF the feature is not executed, this field will not be present. | Optional field-if present, one per Feature |

TABLE II-continued

SIP Services Transaction Detail File Structure - Redirect Server

| Fields | Syntax/Description | Comments |
| --- | --- | --- |
| Terminating Call Screening List Number | <list>text</list><br>This field records the list number that was used to determine whether the call should be screened or allowed. It was retrieved from the subscriber record, which must be present for this feature to be executed. | One per Terminating Call Screening |
| Terminating Call Screening Result | <result>text</result><br>This field records the result of the Terminating Call Screening Feature. The possible values are "Screened" and "Allowed." | One per Terminating Call Screening |
| Terminating Call Screening - End Delimiter | </tcs><br>Used to define the end of the Terminating Call Screening fields within a TDR Record | Optional field-if present, one per Feature |
| Call Forwarding Unconditional | <cfu><br>This field is used to record information when the Call Forwarding Unconditional feature is executed at the RS. If the feature is not executed, this field will not be present. | Optional field-if present. one per Feature |
| Call Forwarding Unconditional Address | <cfu_addr>text</cfu_addr><br>This field record the forwarding address that will be used to redirect the call. | Optional field-if present, one per Feature |
| Call Forwarding Unconditional Nature of Address | <cfu_noa>text</cfu_noa><br>This field records the nature of address that corresponds to the forwarding address that is used to redirect the call.<br>The possible values for this field are the following:<br>"Private"<br>"E.164"<br>"Local"<br>"IP Address" | One per Call Forwarding Unconditional |
| Call Forwarding Unconditional-End Delimiter | </cfu><br>Used to define the end of the Call Forwarding Unconditional fields within a TDR Record | Optional field-if present, one per Feature |
| Find Me | <findme><br>This field is used to record information when the Find Me Feature is executed at the RS. If the feature is not executed, this field will not be present. | Optional field - if present, one per Feature |
| Find Me Error | <error>text</error><br>This field is used to record an error in the find me provisioning. The possible values for this field are:<br>"No Find Me Record found for Subscriber,:<br>"No Find Me Record Found for This Time,"<br>"No find Me Device Sequence List record Found,"<br>"No Active Devices were Found in the Find Me List" | Optional Field - if present, one per Find Me |
| Find Me Category | <fm_cat>text</fm_cat><br>This field records the category that applies to the originating subscriber. The possible values for this field are 0-3, where 0 is the default category. | Optional Field-if present one per Find Me |
| Find Me Device Number | <fm_dev_num>text</fm_dev_num><br>This fields records the device number a device that was found in the applicable find me record. | Optional field-there can be one or more instances of this field within the Find Me field |
| Find Me Address | <fm_addr>text<fm_addr><br>This field records the address of the find me device that will be used to redirect the call. | Optional field-there can be one or more instances of this field within the Find Me field. |
| Find me Nature of Address | <fm_noa>text</fm_noa><br>This field records the nature of address that corresponds to the find me address that will be used to redirect the call.<br>The possible values for this field are the following:<br>"Private"<br>"E.164"<br>"Local"<br>"IP Address" | Optional field- there can be one or more instances of this field within the Find Me field |
| Find Me- End Delimiter | </findme><br>Used to define the end of the Find Me fields within a TDR Record | Optional field - if present, one per Feature |
| Registered Address List | <reglist><br>This field is used to record information when the call is redirected to the list of Registered Addresses (not via the Find ME Feature). If the call is not redirected to the registered addresses, this field will not be present. | Optional field-if present, one per Feature |
| Registered Address | <reg_addr>text</reg_addr><br>This field records a registered address that will be used to redirect the call. | One or more instances of this field within the Registered Address List |

TABLE II-continued

SIP Services Transaction Detail File Structure - Redirect Server

| Fields | Syntax/Description | Comments |
| --- | --- | --- |
| Registered Nature of Address | <reg_noa>text</reg_noa><br>This field records the nature of address that corresponds to the registered address that will be used to redirect the call.<br>The possible values for this field are the following:<br>"Private"<br>"E.164"<br>"IP Address" | One or more instances of this field within the Registered Address List |
| Registered Address List-End Delimiter | </reglist><br>Used to define the end of the Registered Address List fields within a TDR Record | Optional field-if present, one per Feature |
| Default Number | <defnum><br>This field is used to record information when the call is redirected to the default address in the subscriber record. If the call is not redirected to the default address, this field will not be present. | Optional field - if present, one per Feature |
| Default Address | <def_addr>text</def_addr><br>This field records the default address that will be used to redirect the call. | One per Default Number |
| Default Nature of Address | <def_noa>text</def_noa><br>This field records the nature of address that corresponds to the default address that will be used to redirect the call.<br>The possible values for this field are the following:<br>"Private"<br>"E.164"<br>"Local"<br>"IP Address" | One per Default Number |
| Default Number-End Delimiter | </defnum><br>Used to define the end of the Default Number List fields within a TDR Record | Optional field - if present, one per Feature |
| Call Forwarding Busy | <cfb><br>This field is used to record information when the Call Forwarding Busy feature is executed at the RS. If the feature is not executed, this field will not be present. | Optional field-if present, one per Feature |
| Call Forwarding Busy Address | <cfb_addr>text</cfb_addr><br>This field record the forwarding address that will be used to redirect the call. | One per Call Forwarding Busy |
| Call Forwarding Busy Nature of Address | <cfb_noa>text</cfb_noa><br>This field records the nature of address that corresponds to the forwarding address that is used to redirect the call.<br>The possible values for this field are the following:<br>"Private"<br>"E.164"<br>"Local"<br>"IP Address" | One per Call Forwarding Busy |
| Call Forwarding Busy-End Delimiter | </cfb><br>Used to define the end of the Call Forwarding Busy fields within a TDR Record | Optional field-if present, one per Feature |
| Call Forwarding No Answer | <cfna><br>This field is used to record information when the Call Forwarding No Answer feature is executed at the RS. If the feature is not executed, this field will not be present. | Optional field-if present, one per Feature |
| Call Forwarding No Answer Address | <cfna_addr>text</cfna_addr><br>This field records the forwarding address that will be used to redirect the call | One per Call Forwarding No Answer |
| Call Forwarding No Answer Nature of Address | <cfna_noa>text</cfna_addr><br>This field records the nature of address that corresponds to the forwarding address that is used to redirect the call.<br>The possible values for this field are the following:<br>"Private"<br>"E.164"<br>"Local"<br>"IP Address" | One per Call Forwarding No Answer |
| Call Forwarding No Answer-End Delimiter | </cfna><br>Used to define the e4nd of the Call Forwarding No Answer fields with a TDR Record | Optional field-if present one per Feature |
| Feature-End Delimiter | </feature><br>Used to define the end of the Feature fields within a TDR Record | Optional field-if present, one per TDR Record |
| DAP Query | <dap_request><br>This field is used to record information about a query to the DAP concerning a particular routing address | Optional field-if present, one or more instances per TDR Record |

TABLE II-continued

SIP Services Transaction Detail File Structure - Redirect Server

| Fields | Syntax/Description | Comments |
|---|---|---|
| DAP Request | <dap_request><br>This field is used to record the request message that was sent to the DAP. | One per DAP Query |
| Sent-to | <sent-to>AA.BB.CC.DD. : port<sent-to><br>(E.g. 166.23.44.157 : 5060)<br>The IP address and port of the DAP that the request was sent to- where AA, BB, CC, DD can be digits 0 through 255 and port can be a number 1024 through 65535. | One per DAP Request |
| Time | <time>Wed Mar 1 10:55:21 2000</time><br>The time field contains the time that DAP Request was sent in the format specified above. | One time per DAP Request |
| Message Type | <msg_type>text<mst_type><br>This field records the type of message sent to the DAP.<br>Valid values are as follows:<br>"DAL Request" | One per DAP Request |
| NCS Transaction ID | <ncs_trans_id>text</ncs_trans_id><br>This field records the NCS transaction ID that was internally generated at the RS and sent to the DAP | One per DAP Request |
| Originating Switch ID | <o_sid>text</o_sid><br>This field records the Originating Switch ID from the rsoriglocinfo table that is sent from the RS to the DAP | One per DAP Request |
| Originating Trunk Group Number | <o_tgn>text</o_tgn><br>This field records the Originating Trunk Group Number from the rsoriglocinfo table that is sent from the RS to the DAP | One per DAP Request |
| Address Digits | <addr_digs>text</addr_digs><br>This field records the address Digits from the routing | One per Dap Request |
| DAP Request-End Delimiter | </dap_request><br>Used to define the end of the DAP Request fields within a TDR Record | One per DAP Request |
| Event | <event><br>This field is used to record the event that occurred that caused the RS to not receive a response from the RS. | Optional Field -<br>if present,<br>One per DAP Query |
| Time | <time>Wed Mar 1 10:55:21 2000</time><br>The time field contains the time that the event occurred in the format specified above. | One time per Event |
| Event Type | <type>text<type><br>This field is used to record the type of event. The possible values are:<br>"Timeout"<br>"TCP Connection Lost" | One per Event |
| Event-End Delimiter | </event><br>Used to define the end of the Event fields within a TDR Record | Optional Field -<br>if present, one per DAP Query |
| DAP Response | <dap_response><br>This field is used to record the response message that was received from the DAP. If no response was received, this field will not be present.<br>NOTE: Since the interface to the DAP is TCP, there is no reason to record the address and port number that the response is received from. | Optional Field -<br>if present, one per DAP Query |
| Time | <time>Wed Mar 1 10:55:21 2000</time><br>The time field contains the time that the response was received in the format specified above. | One per DAP Response |
| Message Type | <msg_type>text</msg_type><br>This field records the type of message received from the DAP. Valid values are as follows:<br>"Routing Response"<br>"Failure Response" | One per Dap Response |
| NCS Transaction ID | <ncs_trans_id>text</ncs_trans_id><br>This field records the NCS transaction ID that was received in the DAP Response | One per DAP Response |
| Terminating Switch ID | <t_sid>text/t_sid><br>This field records the Terminating Switch ID thar was<br>received in the DAP Response. | Optional field -<br>if present,<br>One per DAP Response |
| Terminating Trunk Group Number | <t_tgn>text<t_tgn><br>This field records the Terminating Trunk Group Number received in the DAP Response. | Optional field -<br>if present,<br>One per DAP Response |
| Action Code | <act_code>text/act_code><br>This field records the action code that was received in the DAP Response. | One per DAP Response |

TABLE II-continued

SIP Services Transaction Detail File Structure - Redirect Server

| Fields | Syntax/Description | Comments |
|---|---|---|
| Subsequent Address | <sub_addr>text</sub_addr><br>This field records the subsequent address that was received in the DAP Response. | Optional field -<br>if present, One per DAP Response |
| Ported Number | <ported_num>text</ported_num><br>This field records the ported number that was received in the DAP Response. | Optional field -<br>if present,<br>One per DAP Response |
| DAP Response -<br>End Delimiter | </dap_response><br>Used to define the end of the DAP Response fields within a TDR Record | Optional Field -<br>if present,<br>One per DAP Query |
| DAP Query -<br>End Delimiter | </dap_query><br>Used to define the end of the DAP Query fields within a TDR Record | Optional field -<br>if persent, one or more instances per Tdr Record |
| Response | <response><br>This field is used to record the final SIP Response that is returned to the NS from the RS. This field is present for all Tdr Records with the exception of the GWSTAT message. That particular message does not result in a response | Optional field -<br>if present,<br>one per Tdr Record |
| Sent-to | <sent-to>AA.BB.CC.DD :port<sent-to><br>(e.g. 166.23.44.157 : 5060)<br>The IP address and port of the NS that the response was sent to - where AA, BB, CC, DD can be digits 0 through 255 and port can be a number 1024 through 65535. | One per Response |
| Time | <time>Wed Mar 1 10:55:21 2000</time><br>The time field contains the time that the Response was<br>sent in the format specified above. | One time per Response |
| Message | <msg>text</msg><br>The contents of the SIP message that was sent to the NS. This will have all the fields associated with the particular response including, but not limited to:<br>Status Line, To, From, Call ID, CSeq, Via, Expires, Feature, Contact, and ReqCtl. | One Message per Response |
| Response-End<br>Delimiter | </response><br>Used to define the end of the Response fields within a TDR Record | Optional Field -<br>if present,<br>one per Tdr Record |
| Tdr Record-<br>End Delimiter | </tdr_record><br>Used to define the end of the Tdr Record fields within a TDR File | Multiple Tdr Records may be in one TDR file (or none if time period expires with no events processed) |
| XML Document<br>Type end | </tdr><br>Used to define the end of the TDR file. | One per TDR file. Always at the end of the file |

Referring back to FIG. 1, OSS 110 is also a critical system for managing network 100. OSS 110 supports the establishment, provisioning, data collection, and billing of the services of the system 100. OSS 110 is a distributed computing system that includes customer management, account management, billing, network facilities provisioning, and network data collection functionality. All of the XML transaction detail files generated by the above described servers SPS 102, RS 104, SCS 106, and VMS 108, are transmitted to OSS 110 using the XML transaction detail files described above. The XML transaction detail files are used by OSS 110 for a variety of network functions including, but not limited to, network management, billing, and record keeping. Thus, the present invention provides a platform independent method for capturing transaction data in a uniform manner. The present invention is extensible, providing embedded information that will enable any receiving computer to read the generic, uniformly formatted XML files without needing any proprietary interface.

In one embodiment, the OSS computing system is based on technology provided by SUN Microsystems, the databases employed by the computing system are based on technology provided by ORACLE. OSS 110 provides and controls access to customer accounts. Users may utilize a web page to monitor service, login to their account, and manage certain elements permitted by user profiles. The account management system allows network personnel to establish, maintain, or deactivate customer accounts. In one embodiment, customer information is viewed via a web interface. The billing system processes customer event records, the customer pricing plan data, adjustments, taxation and other data in the preparation of customer invoices. The network facilities provisioning system provides the information required by network engineers to ensure that the appropriate hardware and software is in place to provide service. This may involve the creation of a customer profile, and the reconfiguration of SPS 102, RS 104, or other network elements. Network provisioning may also require the placement of hardware plug-in devices used in backbone 120.

A process management/work flow system serves as the core of OSS 110. The software is a Common Object Request Broker Architecture (CORBA) based publish-and-subscribe messaging middleware that provides graphical process automation, data transformation, event management and flexible connectors to transact with interfacing applications. This middleware architecture software fulfills the function of integrating all OSS 110 components and may provide hooks to non-OSS components using designated standard interfaces.

Figure 2:
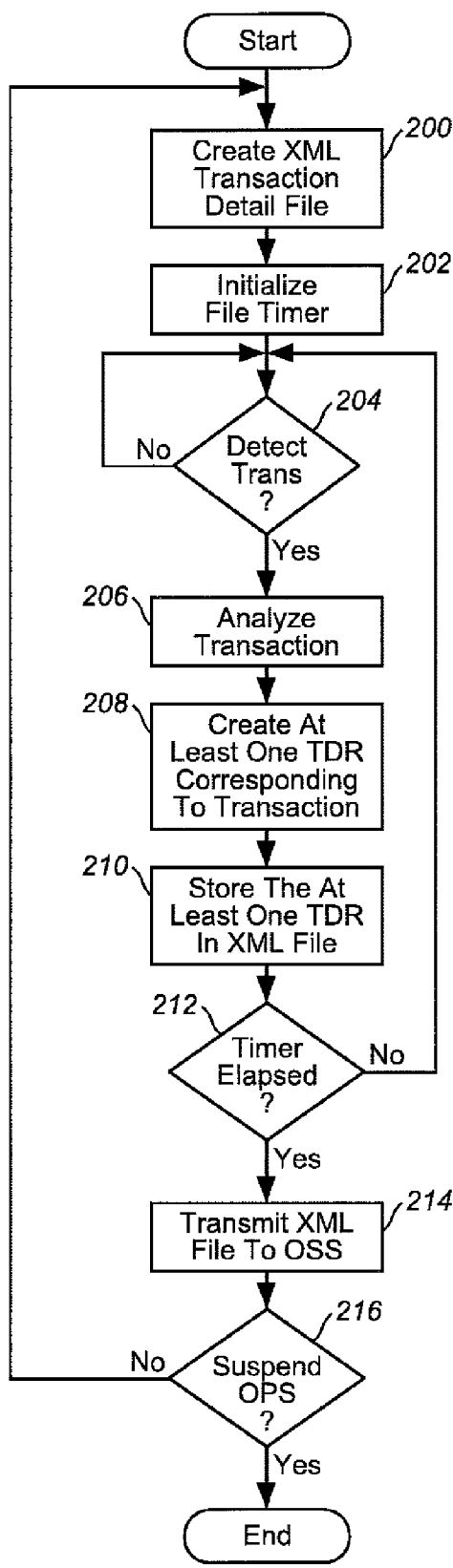
FIG. 2 is a chart showing a method for managing telecommunications transactions in accordance with another embodiment of the present invention.

As embodied herein, and depicted in FIG. 2, a chart showing a method for recording telecommunications transaction data in accordance with the present invention is disclosed.

The method described herein is equally applicable to SPS 102, RS 104, SCS 106, and VMS 108. In step 200, the XML detail file is created. If the file is being created in RS 104, XML detail file will have the form depicted in Table II, otherwise, the XML detail file will be of the form, or similar to the form, shown in Table I. Each XML file is active for a predetermined period of time. Thus, once the XML file is created, the server initializes a timer to track elapsed time. For example, OSS 110 may direct each server to keep each XML detail file active for one day, or one hour, as the case may be. In step 204, if a transaction is detected, the server analyzes the transaction and performs an appropriate action. For example, SPS 102 (See FIG. 1) may receive an INVITE message from SIP-phone 50, requesting a session with a user at POTS telephone 22. In processing the INVITE message, SPS 102 may perform and coordinate a plurality of transactions required to set up the session between SIP phone 50 and POTS telephone 22. In doing so, SPS 102 creates a transaction detail record (TDR) for each transaction in the call set-up process. In step 210, the TDRs are written into the XML file. On the other hand, if there are no transactions generated in the predetermined time period, no records are written into the file. In this case, only the header information in the XML file is transmitted to OSS 110.

Once the timer has elapsed, the server transmits the XML file to OSS 110. After the XML file is transmitted, a new file is created and the process repeats. If the timer has not elapsed, the server waits for additional transactions to process. In step 216, the server may suspend operations for any number of reasons. For example, if the server requires maintenance and is offline, it is unnecessary to continue to monitor and record network transactions.

Those of ordinary skill in the art will recognize that the use of XML transaction detail files in accordance with the present invention can be employed for any events occurring within network 10. Calls placed between all or any combinations of SIP-phones, enterprise gateways, network gateways, DAL gateways, INCP gateways, SIP-voicemail servers, and SIP conferencing servers may employ the present invention. Those of ordinary skill in the art will also recognize that the present invention can be employed using any suitable type of transport network. Further, the present invention is applicable to any type of session that may be established including, but not limited to, telephony, video, audio, instant messaging, and etc. It is also contemplated that the present invention may be employed for billing, monitoring, management, or for any of a wide variety of services performed by the network.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A computer-readable medium having stored thereon computer-executable instructions to cause a processor in a network device to perform a method comprising:
  storing an extensible markup language (XML) transaction detail file, the XML transaction detail file comprising:
    an XML declaration field, the XML declaration field including data defining the XML transaction detail file as an XML file,
    a server identification field, the server identification field including an internet protocol (IP) address of a first server generating the XML transaction detail file, and
    a transaction detail section including at least one transaction detail record, the at least one transaction detail record being stored in the transaction detail section in response to a telecommunications transaction, the at least one transaction detail record including transaction data corresponding to the telecommunications transaction;
  enabling the XML transaction detail file to be active for a particular period of time; and
  transmitting the XML transaction detail file to a second server,
  where the at least one transaction detail record includes an authentication section, the authentication section including data indicating a time when an authentication was performed, a cause for the authentication, and a result of the authentication.

2. The computer-readable medium of claim 1, where the XML transaction detail file further comprises a time/date field including data indicating a time and date that the XML transaction detail file was opened.

3. The computer-readable medium of claim 1, where the first server comprises an internet protocol (IP) network server.

4. The computer-readable medium of claim 3, where the server identification field further includes an IP address of at least one of a proxy server, a conferencing server, or a voice mail server.

5. The computer-readable medium of claim 3,
  where the at least one transaction detail record includes a plurality of transaction detail records,
  where the telecommunication transaction comprises a plurality of telecommunication transactions, and
  one of the plurality of transaction detail records includes a correlation identification field including data correlating the one of the plurality of transaction detail records to one of the plurality of telecommunication transactions.

6. The computer-readable medium of claim 3, where one of the at least one transaction detail record includes a request section including information related to a session initiation protocol (SIP) request that is either sent or received by the IP network server.

7. The computer-readable medium of claim 6, where the request section includes a received-from field including data indicating an IP address of at least one of a sender of the SIP request or an addressee of the SIP request.

8. The computer-readable medium of claim 6, where the request section includes a message field including data contained in the SIP request.

9. The computer-readable medium of claim 3, where the at least one transaction detail record includes a response section including information related to a SIP response that is either sent or received by the IP network server.

10. The computer-readable medium of claim 9, where the response section includes a received-from field including data indicating an IP address of at least one or a sender or an addressee of the SIP response.

11. The computer-readable medium of claim 9, where the response section includes a message field including data contained in the SIP response.

12. The computer-readable medium of claim 1, where one of the at least one transaction detail record includes a time/date field including data indicating when the one of the at least one transaction detail record was made.

13. A computer-readable medium having stored thereon computer-executable instructions to cause a processor in a network device to perform a method comprising:

storing an extensible markup language (XML) transaction detail file, the XML transaction detail file comprising:
   an XML declaration field, the XML declaration field including data defining the XML transaction detail file as an XML file,
   a server identification field, the server identification field including an internet protocol (IP) address of a first server generating the XML transaction detail file, and
   a transaction detail section including at least one transaction detail record, the at least one transaction detail record being stored in the transaction detail section in response to a telecommunications transaction, the at least one transaction detail record including transaction data corresponding to the telecommunications transaction;
enabling the XML transaction detail file to be active for a particular period of time and
transmitting the XML transaction detail file to a second server,
where the first server comprises an internet protocol (IP) network server, and
where one of the at least one transaction detail record includes an event section including data recording at least one event that occurred at the IP network server, where the at least one event is unrelated to receiving or sending a message by the IP network server.

14. The computer-readable medium of claim 13, where the at least one event includes at least one of a timeout event or an error event.

15. A computer-readable medium having stored thereon computer-executable instructions to cause a processor in a network device to perform a comprising:
storing an extensible markup language (XML) transaction detail file, the XML transaction detail file comprising:
   an XML declaration field, the XML declaration field including data defining the XML transaction detail file as an XML file,
   a server identification field, the server identification field including an internet protocol (IP) address of a first server generating the XML transaction detail file, and
   a transaction detail section including at least one transaction detail record, the at least one transaction detail record being stored in the transaction detail section in response to a telecommunications transaction, the at least one transaction detail record including transaction data corresponding to the telecommunications transaction;
enabling the XML transaction detail file to be active for a particular period of time and
transmitting the XML transaction detail file to a second server,
where the first server comprises a session initiation protocol (SIP) redirect server, and
where the at least one transaction detail record includes a features section that includes data related at least one feature executed by the SIP redirect server during the transaction.

16. The computer-readable medium of claim 15, where the server identification field includes an IP address of the SIP redirect server.

17. The computer-readable medium of claim 15,
where the at least one transaction detail record includes a plurality of transaction detail records,
where the telecommunication transaction comprises one or more telecommunication transaction, and
one of the plurality of the transaction detail records includes a correlation identification field including data correlating the one of the plurality of the transaction detail record to a corresponding one of the one or more telecommunication transaction.

18. The computer-readable medium of claim 15, where each one of the at least one transaction detail record includes a time/date field including data indicating when the one of the at least one transaction detail record was made.

19. The computer-readable medium of claim 15, where one of the at least one transaction detail record includes a request section including information related to a SIP request that is received by the SIP redirect server from a SIP network server.

20. The computer-readable medium of claim 19, where the request section includes a received-from field including data indicating an IP address of an original sender of the SIP request.

21. The computer-readable medium of claim 19, where the request section includes a message field including data contained in the SIP request.

22. The computer-readable medium of claim 15, where one of the at least one transaction detail record includes a response section including information about a SIP response that is received by the SIP redirect server from a SIP network server.

23. The computer-readable medium of claim 22, where the response section includes a sent-to field including data indicating an IP address of an addressee of the SIP response.

24. The computer-readable medium of claim 22, where the response section includes a message field including data associated with the response.

25. The computer-readable medium of claim 15, where the features section includes at least one recursive routing field that includes data related to a recursive call routing feature.

26. The computer-readable medium of claim 15, where the features section includes at least one originating call validation field, the at least one originating call validation field including data relating to a validation of a call originator and relating to the call originator.

27. The computer-readable medium of claim 15, where the features section includes a non-trusted terminating call field that includes data related to whether a non-trusted call was allowed during the telecommunications transaction.

28. The computer-readable medium of claim 15, where the features section includes at least one terminating call validation field, the at least one terminating call validation field including data relating to a validation of a subscriber being called and relating to the subscriber.

29. The computer-readable medium of claim 15, where the features section includes at least one originating call screening field including information indicating when a call screening feature is executed.

30. The computer-readable medium of claim 15, where the features section includes at least one terminating call screening field including information indicating when a terminating call screening feature is executed.

31. The computer-readable medium of claim 15, where the features section includes at least one call forwarding field including information indicating when at least one call forwarding feature is executed.

32. The computer-readable medium of claim 15, where the features section includes at least one find-me field including information indicating when a find-me feature is executed.

33. The computer-readable medium of claim 15, where the features section includes at least one registered address list field including information indicating to when a call is redirected to a list of registered addresses.

34. The computer-readable medium of claim 15, where the features section includes at least one default address field including information indicating when a call is redirected to a default address in a subscriber's record.

35. A computer-readable medium having stored thereon computer-executable instructions to cause a processor in a network device to perform a method comprising:
storing an extensible markup language (XML) transaction detail file, the XML transaction detail file comprising:
an XML declaration field, the XML declaration field including data defining the XML transaction detail as an XML file,
a server identification field, the server identification field including an internet protocol (IP) address of a first server generating the XML transaction detail file, and
a transaction detail section including at least one transaction detail record, the at least one transaction detail record being stored in the transaction detail section in response to a telecommunications transaction, the at least one transaction detail record including transaction data corresponding to the telecommunication transaction;
enabling the XML transaction detail file to be active for a particular period of time; and
transmitting the XML transaction detail file to a second server,
where each transaction detail record includes at least one directory access protocol (DAP) field including information associated with one or more DAP communication, and
where the first server comprises a session initiation protocol (SIP) redirect server.

36. A server device comprising:
a processor configured to:
generate an extensible markup language (XML) transaction detail file that is active for a particular period of time, where the XML transaction detail file comprises:
an XML declaration field including data defining the XML transaction detail file as an XML file,
a server identification field, the server identification field including an internet protocol (IP) address of the server device, and
a transaction detail section;
receive transaction data related to a telecommunications transaction, the telecommunications transaction occurring during the particular period of time;
in response to receiving transaction data related to the telecommunications transaction, add at least one transaction detail record to the transaction detail section, the at least one transaction detail record including the transaction data corresponding to the telecommunications transaction, where each of the at least one transaction detail record includes an authentication section, the authentication section including data indicating a time when an authentication was performed, a reason for the authentication, and a result of the authentication; and
transmit the XML transaction detail file to another server device.

37. The server device of claim 36, where the XML transaction detail file further comprises a time/date field including data indicating when the XML transaction detail file was opened.

38. The server device of claim 36, where each of the at least one transaction detail record includes a time/date field including data indicating when the each of the at least one transaction detail record was made.

39. The server device of claim 36, where the server device comprises one of an internet protocol (IP) network server or a session initiation protocol (SIP) redirect server.

40. The server device of claim 36,
where the at least one transaction detail record includes a plurality of transaction detail records,
where the telecommunication transaction comprises a plurality of telecommunication transactions, and
where each one of the plurality of transaction detail records includes a correlation identification field including data correlating said one of the plurality of transaction detail records to one of the plurality of telecommunication transactions.

41. The server device of claim 36, where one of the at least one transaction detail record includes a session initiation protocol (SIP) message section including information related to a SIP message that is either sent or received by the server device, where the SIP message includes an SIP request or an SIP response.

42. The server device of claim 41, where the SIP message section includes a received-from field including data indicating an IP address of at least one of a sender or an addressee of the SIP message.

43. The server device of claim 41, where the SIP message section includes a content field including data contained the SIP message.

44. A server device comprising:
a processor configured to:
generate an extensible markup language (XML) transaction detail file that is active for a particular period of time, where the XML transaction detail file comprises:
an XML declaration field including data defining the XML transaction detail as an XML file,
a server identification field, the server identification field including an internet protocol (IP) address of the server device, and
a transaction detail section;
receive transaction data related to a telecommunications transaction, the telecommunications transaction occurring during the particular period of time;
in response to receiving the transaction data related to the telecommunications transaction, add at least one transaction detail record to the transaction detail section, the at least one transaction detail record including the transaction data corresponding to the telecommunications transaction, where one of the at least one transaction detail record includes an event section including data recording at least one event that occurred at the server device, where the at least one event is unrelated to receiving or sending a message by the server device; and
transmit the XML transaction detail file to another server device.

45. The server device of claim 44, where the at least one event includes at least one of a timeout event or an error event.

* * * * *